(No Model.)
J. C. BAUER.
PROCESS OF HOPPING WORT.
No. 326,383. Patented Sept. 15, 1885.
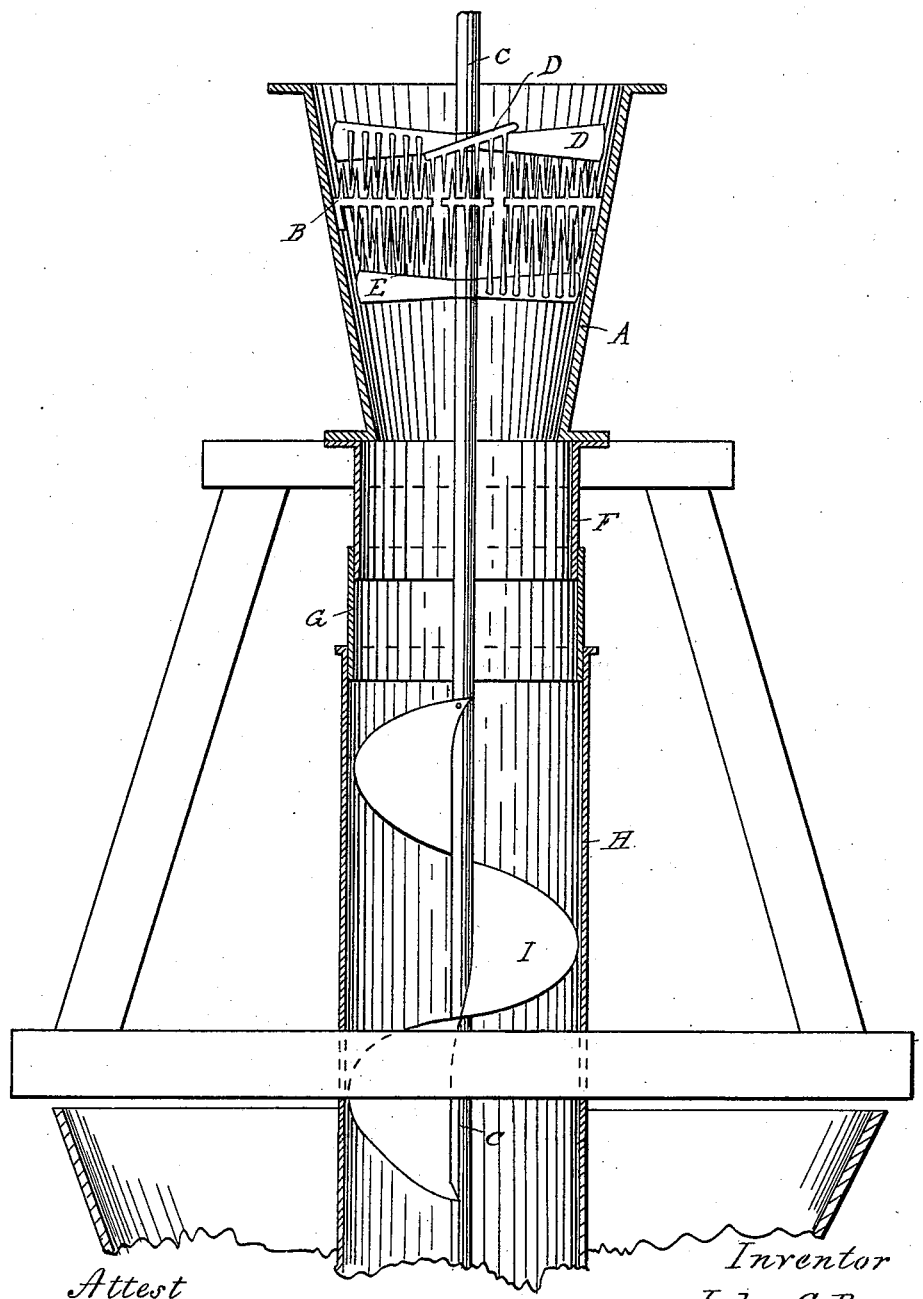
Attest
E. Scully.
James Finks
Inventor
John C. Bauer
By Thos. S. Sprague
Atty

UNITED STATES PATENT OFFICE.

JOHN C. BAUER, OF DETROIT, MICHIGAN.

PROCESS OF HOPPING WORT.

SPECIFICATION forming part of Letters Patent No. 326,383, dated September 15, 1885.

Application filed January 23, 1884. (No model.)

*To all whom it may concern:*

Be it known that I, JOHN C. BAUER, of Detroit, in the county of Wayne and State of Michigan, have invented new and useful Improvements in Process of Hopping Wort; and I do hereby declare that the following is a full, clear, and exact description thereof, reference being had to the accompanying drawings, which form a part of this specification.

This invention relates to certain new and useful improvements in process of discharging hops at or near the bottom of the brewer's kettle wherein beer is being brewed. It has been the practice in the process of brewing, when the kettle has been filled with the liquor at a high heat, to discharge the hops necessary to be used in the process into the kettle. The hops being very light they float on the surface of the liquor, and a large proportion of the volatile properties of such hops escape into the air and are wasted before the hops are immersed in the liquor and steeped. By the process in ordinary use, after the hops are discharged onto the surface of the liquor, the operators are required, by means of paddles or similar appliances, to force them under the surface of the liquor as soon as possible to prevent this loss of volatile properties, which are so valuable in the manufacture of malt and hop beverages. It is the object of the present invention to carry such hops to the bottom of the liquor in the kettle and discharge them at or near that point, so that they become thoroughly steeped and deprived of all their essential elements before they rise to the top.

The invention consists in providing mechanical means, substantially as described, by which the lumps created by compressing the hops together in packing are broken up, conveyed to a point near the bottom of the kettle, and discharged therein, as more fully hereinafter specified.

The accompanying drawing, which forms a part of this specification, shows a vertical section of the entire machine.

A represents the breaking-up hopper, which may be surmounted by a plain hopper, into which the hops are discharged from the bale. This hopper A is provided with one or more double rake-heads, B, secured between the walls of the hopper, and provided with teeth projecting both upward and downward, as shown.

C is a shaft, the upper end of which is suitably journaled, and the lower end thereof suitably stepped in a proper bearing, and has attached to it within the hopper in which said shaft is centrally and vertically situated the wings or arms D and E, the former of which is provided with a series of downwardly-projecting rake-teeth, and the latter with similar teeth projecting upward, both said arms rotating with said shaft, and the teeth thereof in such rotation passing between the teeth of the double rake-head B, whereby the lumps or cakes are broken up in their downward passage through said head B. This head B discharges into a cylinder, F, secured to its lower end, and the lower end of such cylinder terminates within a spider-pulley, G, which is secured to the shaft, and by means of a belt is driven from any suitable source of power. The lower end of the pulley G projects into the conveyer-cylinder H, so that there will be a free discharge from the hopper B through the pulley into the conveyer-cylinder, through which also the shaft C passes, and has attached to it a spiral conveyer-plate, I. This device is supported upon a suitable frame, preferably standing upon the floor above the kettle, and the cylinder H, shaft C, and conveyer-screw I project downwardly, so as to discharge the hops passing through the device at or near the bottom of the kettle.

It will be noticed that the wings D are set at an angle to the shaft, or inclined in the form of a screw-propeller. I attach importance to this arrangement, for by it the hops, as they are fed into the hopper, are forced downward in contact with the teeth.

What I claim as my invention is—

The process of breaking up and conveying hops to a point at or near the bottom of a kettle filled with liquor, and there discharging them by mechanical means, substantially as herein specified.

JOHN C. BAUER.

Witnesses:
E. SCULLY,
H. S. SPRAGUE.